United States Patent
Venkataraman et al.

(10) Patent No.: US 10,208,762 B2
(45) Date of Patent: Feb. 19, 2019

(54) SWIRL BRAKES FOR COMPRESSORS WITH TEETH-ON-ROTOR SEALS

(71) Applicant: Solar Turbines Incorporated, San Diego, CA (US)

(72) Inventors: Balaji Venkataraman, San Diego, CA (US); David Howard Moulton, Poway, CA (US); Michael James Cave, Oceanside, CA (US)

(73) Assignee: Solar Turbines Incorporated, San Diego, CA (US)

( * ) Notice: Subject to any disclaimer, the term of this patent is extended or adjusted under 35 U.S.C. 154(b) by 227 days.

(21) Appl. No.: 15/289,811

(22) Filed: Oct. 10, 2016

(65) Prior Publication Data

US 2018/0100514 A1    Apr. 12, 2018

(51) Int. Cl.
*F04D 29/16* (2006.01)
*F04D 17/12* (2006.01)
(Continued)

(52) U.S. Cl.
CPC .......... *F04D 29/162* (2013.01); *F04D 17/12* (2013.01); *F04D 29/00* (2013.01); *F04D 29/08* (2013.01); *F16J 15/4472* (2013.01)

(58) Field of Classification Search
CPC ...... F04D 29/162; F04D 29/124; F04D 17/12; F04D 29/00; F04D 29/12; F04D 29/122; F04D 29/10; F04D 29/083; F04D 29/08; F16J 15/447; F16J 15/4472; Y02T 10/125; Y02T 10/18; Y02T 10/123
See application file for complete search history.

(56) References Cited

U.S. PATENT DOCUMENTS 5,190,440 A * 3/1993 Maier .................... F01D 11/02
277/412
9,057,383 B2   6/2015 Vannini et al.
(Continued)

FOREIGN PATENT DOCUMENTS

CN        204941617 U     1/2016

OTHER PUBLICATIONS

D. W. Childs et al., Test Results for Rotordynamic Coefficients of the SSME HPOTP Turbine Interstage Seal with Two Swirl Brakes, Jun. 1991, American Society of Mechanical Engineers (ASME), vol. 113, pp. 577-583.*

(Continued)

*Primary Examiner* — David E Sosnowski
*Assistant Examiner* — Mara Boardman
(74) *Attorney, Agent, or Firm* — Procopio, Cory, Hargreaves & Savitch LLP (57) ABSTRACT

A device and method for reducing swirl in a gas compressor is provided. The device can include a tubular or annular seal body having an abradable interior surface for use in forming a seal. The tubular body can further have a plurality of swirl teeth arranged on a high pressure side of the seal body. The swirl teeth are disposed so as to form swirl slots between the adjacent swirl teeth. The swirl teeth can have a brake chord and a brake pitch describing the length and separation of each adjacent swirl tooth. The ratio of the brake pitch to the brake chord can be optimized in order to maximize creation of free vortices between the swirl teeth as the compressor rotates for swirl reduction.

15 Claims, 6 Drawing Sheets

(51) Int. Cl.
    *F16J 15/447*    (2006.01)
    *F04D 29/00*    (2006.01)
    *F04D 29/08*    (2006.01)

(56)                References Cited

U.S. PATENT DOCUMENTS 9,200,528  B2    12/2015  Zheng et al.
    2006/0237914 A1*  10/2006  Li .......................... F16J 15/445
                                                        277/415
    2013/0017072 A1   1/2013   Ali et al.
    2014/0205444 A1   7/2014   Zheng et al.
    2015/0086343 A1   3/2015   Rizzo et al.

OTHER PUBLICATIONS

Leonardo Baldassarre et al., Optimization of Swirl Brake Design and Assessment of its Stabilizing Effect on Compressor Rotordynamic Performance, Sep. 25, 2014, Turbomachine Laboratory Texas A&M Engineering Experiment Station.*

Baldassarre, et al., "Optimization of Swirl Brake Design and Assessment of Its Stabilizing Effect on Compressor Rotordynamic Performance"; 43rd Turbomachinery & 30th Pump Users Symposia (Pump & Turbo 2014); Sep. 23-25, 2014 | Houston, TX | pumpturbo.tamu.edu; pp. 1-12.

* cited by examiner

SWIRL BRAKES FOR COMPRESSORS WITH TEETH-ON-ROTOR SEALS

TECHNICAL FIELD

The present disclosure generally pertains to increasing performance of gas compressors. More particularly, this disclosure relates maximizing swirl reduction in individual gas compressor stage labyrinth seals.

BACKGROUND

Gas compressors exist in various forms and can have separated drive and compressor coupled by a drive shaft. Some related examples include, integrated hydroelectric generators, wind turbines with hub generators, etc. For pressurized devices such as compressors, several seals can be used to seal the shaft and various compressor stages from each other and from the atmosphere. Magnetic bearings may support moving machinery without physical contact. For example, they can levitate a rotating shaft, providing for rotation with very low friction and no mechanical wear. However in order to provide compression of a working fluid (e.g., air or other gaseous compounds) multiple seals may be needed between compressor stages and between the compressor and the atmosphere. Such seals can be low friction mechanical seals with a tortuous path from inlet to outlet to prevent leakages. An example of such a tortuous mechanical seal is a labyrinth seal.

A labyrinth seal may be comprised of many grooves that press tightly inside another axle, or inside a hole, so that the working fluid has to pass through a long and difficult path to escape. The grooves interlock, to produce the long characteristic path which slows leakage. For labyrinth seals on a rotating shaft such as in a gas compressor, a very small clearance must exist between the tips of the labyrinth threads, or labyrinth teeth, and the running surface of the labyrinth seal.

Labyrinth seals on rotating shafts provide non-contact sealing action by controlling the passage of fluid through a variety of chambers by centrifugal motion, as well as by the formation of controlled fluid vortices. At higher speeds, centrifugal motion forces the liquid towards the outside and therefore away from any passages. Similarly, if the labyrinth chambers are correctly designed, any working fluid that has escaped the main chamber becomes entrapped in a labyrinth chamber, where it is forced into a vortex-like motion. This acts to prevent its escape, and also acts to repel any other fluid.

As the rotational speed or RPM (revolutions per minute) increase, the gas compressor can impart a rotational or circumferential velocity on the compressed fluid, on the high-pressure side (or high pressure end) of the compressor stage. If left uncontrolled, the circumferential velocity of the compressed fluid can continue to increase upstream of the labyrinth seals, leading to vibrations, or self-excitation. The self-excitation can occur at a natural or resonant frequency, and can cause significant damage to compressor or motor components. In some examples, a controller can monitor vibrations and other parameters. The controller can further shut the compressor down in the event one or more parameters exceeds a predetermined limit. In some examples, swirl brakes can be used to reduce the circumferential velocity, or swirl, of the compressed fluid. The number and arrangement of the swirl brakes can maximize swirl reduction and enhance the performance of the compressor. The present disclosure is directed toward overcoming one or more of the problems discovered by the inventors or that is known in the art.

SUMMARY

An aspect of the disclosure provides a labyrinth seal for reducing circumferential velocity in a compressor having one or more centrifugal compressor stages. The labyrinth seal can have a seal body. The seal body can have an annular shape, a forward surface corresponding to a low pressure end of the labyrinth seal, and an aft surface corresponding to a high pressure end of the labyrinth seal. The seal body can also have an interior surface formed from an abradable material operable to contact a plurality of labyrinth teeth of the one or more centrifugal compressor stages. The labyrinth seal can also have a plurality of swirl teeth extending from the aft surface of the seal body. Each swirl tooth of the plurality of swirl teeth can have a swirl tooth end surface distal to the aft surface and a brake chord, the brake chord defining a separation between the aft surface and the swirl tooth end surface. The labyrinth seal can also have a plurality of swirl slots formed between adjacent swirl teeth of the plurality of swirl teeth. Each swirl slot of the plurality of swirl slots can have a brake pitch defining a distance between the adjacent swirl teeth.

Another aspect of the disclosure provides a labyrinth seal assembly for reducing swirl in one or more compressor stages of a multi stage gas compressor. The labyrinth seal assembly can have a labyrinth seal. The labyrinth seal can have a tubular body having a low pressure end opposite a high pressure end and an interior surface formed of an abradable material. The labyrinth seal can also have a plurality of swirl teeth extending from the high pressure end of the tubular body. Each swirl tooth of the plurality of swirl teeth can have swirl tooth end surface, a brake chord defining a separation between the high pressure end and the swirl tooth end surface, and a brake pitch defining a separation between adjacent swirl brakes of the plurality of swirl brakes, such that the plurality of swirl brakes are evenly distributed about the high pressure end. The labyrinth seal assembly can also have a plurality of labyrinth teeth proximate the interior surface and operable to score the abradable surface as the compressor rotates, an aft most labyrinth tooth of the plurality of labyrinth teeth being proximate the high pressure end and a forward most labyrinth tooth of the plurality of labyrinth teeth being proximate the low pressure end.

Other features and advantages will become clear with a review of the following description.

DETAILED DESCRIPTION

The present disclosure relates to a centrifugal gas compressor. Embodiments provide a compressor that can be driven by a gas turbine, an electric motor, or mechanical driver, referred to herein as a compressor driver. Other embodiments can include other types of mechanical systems and associated components. The compressor rotor can be rotatably mounted on a fixed central axle of a compressor bearing system. The impellers can be mounted to the compressor rotor and rotated to compress a working fluid (e.g., air or a gas).

Figure 1:
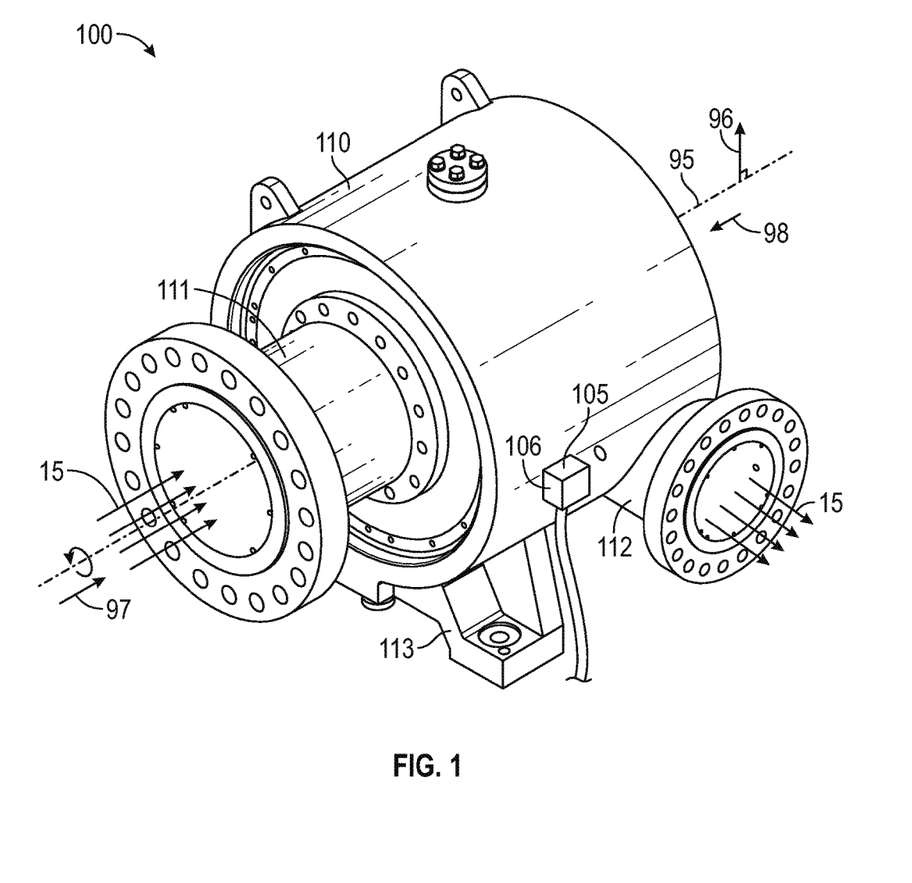
FIG. 1 is a perspective view of an exemplary compressor.

FIG. 1 is a perspective view of an exemplary gas compressor. In particular, the illustrated compressor 100 is embodied as an radially or axially-fed, industrial centrifugal gas compressor having a side discharge. However, this particular configuration is merely for illustration purposes, as the illustrated compressor 100 can include any combination of singular or plural, axial, linear, and radial feeds and discharges. Likewise, the present disclosure may be applied to other types of pumps, compressors, and the like. Here and in other figures, various components and surfaces have been left out or simplified for clarity purposes and ease of explanation.

For reference, the compressor 100 generally includes a center axis 95 about which its primary rotating components rotate. The center axis 95 may be common to or shared with various other components of the compressor 100. All references to radial, axial, and circumferential directions and measures refer to center axis 95, unless specified otherwise, and terms such as "inner" and "outer" or "inward" and "outward" generally indicate a lesser or greater radial distance from the center axis 95, wherein a radial 96 may be in any direction perpendicular and radiating outward from center axis 95.

In addition, this disclosure may reference a forward and an aft direction. Generally, all references to "forward" and "aft" are associated with a flow direction, relative to the center axis 95, of the compressed gas. In particular, the suction end 97 (inlet) of the compressor 100, relative to the center axis 95 is referred to as the forward end or forward direction. Accordingly, the opposite end or discharge end 98 is referred to as the aft end or direction, unless specified otherwise.

Externally, the compressor 100 includes a compressor housing 110 and an external power supply interface 105 and a communication interface 106. Here, the communication interface 106 is illustrated as combined with the external power supply interface 105 for convenience; however, the communication interface 106 may be embodied as separate from the external power supply interface 105.

Generally, the compressor housing 110 encloses and supports internal components of the compressor 100. Also, unlike a conventional shaft-driven compressor (requiring a dynamic seal), the external power supply interface 105 and the communication interface 106 may be statically sealed to compressor housing 110.

Additional controls for the compressor 100 may be integrated into the compressor 100 and/or located remotely. Moreover, communications, feedback, and control for the compressor 100 may be interfaced independently, as discussed above. Alternately, communications, feedback, and control for the compressor 100 may be interfaced via the external power supply interface 105.

The compressor housing 110 can have a suction port 111 and a discharge port 112. The suction port 111 interfaces with a fluid supply (not shown), and is configured to supply a fluid (e.g. working gas, working fluid, process gas, pumped fluid, etc.) to the compressor 100. Here, the fluid is a gas 15. Similarly, the discharge port 112 interfaces with a fluid discharge (not shown), and is configured to discharge the gas 15 from the compressor 100. The compressor housing 110 may also include support legs 113, or other features to secure or physically ground the compressor 100.

Figure 2:
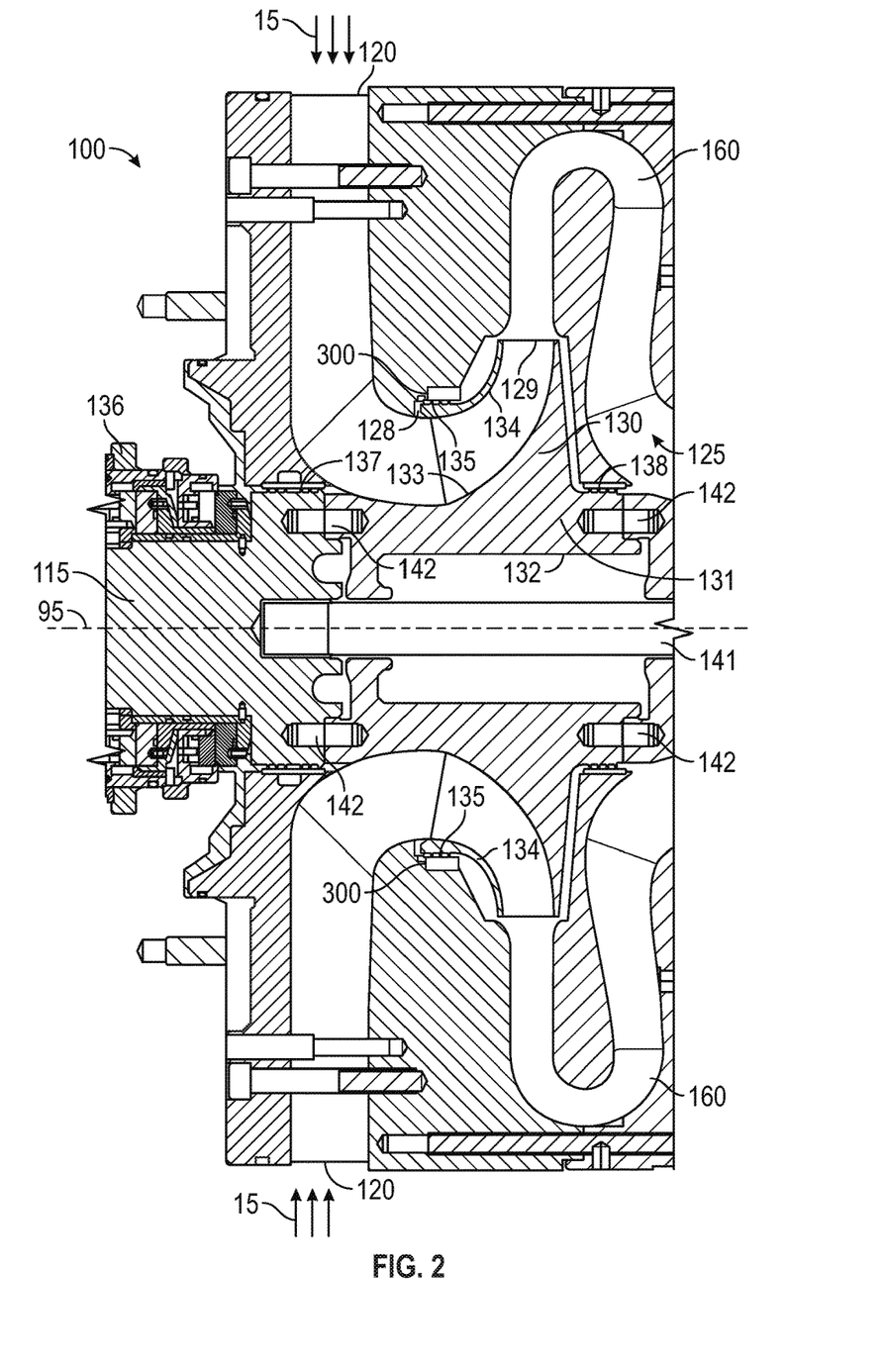
FIG. 2 is a cross sectional side view of a portion of the compressor of FIG. 1.

FIG. 2 is a cross sectional view of an embodiment of the internally driven compressor of FIG. 1. The compressor 100 can have multiple compressor stages, however only a single compressor stage is shown for illustrative purposes. As above, various components and surfaces may have been left out, cut away, and/or simplified for clarity purposes and ease of description. As shown, the gas 15 enters the compressor 100 axially through the suction port 111, is compressed in one or more subsequent compressor stages, collected, and ultimately discharged through the discharge port 112.

Internally, the compressor 100 can have a compressor inlet 120, a compressor outlet 125, a compressor stator, a compressor rotor 130 coupled to a central axle 115 that is in turn coupled to a mechanical driver (not shown), such as, for example, an electric motor or gas turbine. The central axle 115 can ride on a compressor bearing system (e.g. a magnetic or mechanical bearing system, not shown). The internal driver and the compressor bearing system are configured to drive and support the compressor rotor 130 about the center axis 95, respectively. The compressor rotor 130 rides in a cavity within the compressor housing 110. In addition, the internal driver and the compressor bearing system are enclosed within the compressor housing 110. According to an embodiment, the internal-driven compressor 100 may include a powered compressor rotor assembly including portions of the powered compressor rotor 130 and the internal driver coupled to the central axle 115.

The compressor rotor 130 can be an impeller in a centrifugal gas compressor as shown in FIG. 2. The compressor rotor 130 makes up a single compression stage (as discussed below, additional stages may be used). Thus the compressor rotor 130 can have a low pressure end 128 and a high pressure end 129. The internal-driven compressor 100 may further include a diffuser 160 downstream of the high pressure end 129 of the compressor rotor 130. Thus, the gas 15 compressed by the powered compressor rotor 130 may then be diffused by the diffuser 160 and discharged or passed to a subsequent compressor stage.

The compressor inlet 120 includes an upstream opening in the compressor housing 110 configured to introduce the gas 15 into the compressor flow path within the compressor housing 110. The compressor inlet 120 can be an annular cavity that can deliver the gas 15 circumferentially about the compressor 100. The compressor flow path may be bound in part by the compressor housing 110 (or additional structures within the compressor housing 110), and in part by the powered compressor rotor 130. Here the compressor inlet 120 is configured as a radial inlet with the compressor inlet 120 on the top and bottom of FIG. 2; however, in other embodiments the compressor inlet 120 may be configured as an axial or side inlet.

The compressor inlet 120 may generally include the suction port 111 and any flow distributing/shaping features downstream of the suction port 111 and upstream of the powered compressor rotor 130. For example, these features may include the stator 140, in addition to struts, vanes, ducting, in-line filters, etc.

The discharge port 112 can be a portion of a compressor outlet having a downstream opening in the compressor housing 110 configured to discharge the gas 15 from the compressor housing 110. For example, the downstream opening may be defined by the interface between the compressor housing 110 and the discharge port 112 (FIG. 1). Moreover, the compressor outlet may generally include the discharge port 112 and any upstream flow distributing/shaping features. These upstream flow distributing/shaping features may include struts, vanes, ducting, etc. upstream of the discharge port 112 and downstream of the powered compressor rotor 130 or the diffuser 160 and any subsequent compressor stages. According to an embodiment, the compressor outlet may include a plurality of outlet vanes radially distributed about the center axis 95, downstream of the powered compressor rotor 130. The plurality of outlet vanes may be configured to reduce swirl in the gas 15 imparted by the powered compressor rotor 130.

According to one embodiment, the powered compressor rotor 130 may be a powered impeller, having portions of the internal driver embedded into or otherwise fixed to the powered impeller. The powered impeller can have a tie bolt 141 coupling multiple compressor stages can be coupled via a plurality of torque pins 142. The torque pins can transfer torque from the central axle 115 to the first stage compressor rotor 130, and then to a subsequent compressor rotor. The tie bolt 141 can provide axial support and maintain the coupling between the drive shaft, the torque pins 142, and a series of compressor stages (e.g., the compressor rotor 130).

The powered impeller (e.g., the compressor rotor 130) may include an annular body 131 having an impeller bore surface 132, and a series of impeller vanes 133 about an impeller axis, coincident with the center axis 95. The annular body 131 includes an opening or impeller bore about the impeller axis. The center axis 95 may be shared or common to the impeller axis when installed. Additional features of the powered impeller may be integrated in or otherwise extend from the annular body. In some embodiments the bore of the annular body 131 may be closed at one or more locations along the center axis 95.

The impeller bore surface 132 is an inner surface of the powered impeller, circumscribing the center axis 95. Moreover, the impeller bore surface 132 may include one or more grooves, notches, slots, or other departures from a regular (e.g., cylindrical) surface, such that one or more components may be fixed to, or features may be added to the powered compressor rotor 130. For example, the impeller bore surface 132 may include a departure from a regular surface of rotation (e.g., cutout, cavity, groove, etc.), such that it is configured to engage the tie bolt 141. Likewise, portions of the tie bolt 141 may be embedded in the departure from the regular surface of rotation.

The compressor rotor 130 may be engaged (or fixed to and located) to the central axle 115 via the toque pins and/or the tie bolt 141. Being coupled directly to the central axle 115, the compressor rotor 130 is thus configured to rotate its impeller vanes 133 about the center axis 95 in direct response to a torsional force imparted by the compressor driver.

Additionally, the series of impeller vanes 133 may include flow motion transmission surfaces extending from the annular body 131. The series of impeller vanes 133 may be configured to compress and/or redirect the gas 15 along the compression flow path. For example, here, the series of impeller vanes 133 are configured to compress the flow of gas while redirecting it into a radial flow toward the high pressure end 129.

Furthermore, and as illustrated, the powered impeller (e.g., the compressor rotor 130) may be a covered or enclosed impeller. Thus, the series of impeller vanes 133 may be part of a series of ducted vanes. The series of ducted vanes includes a shroud 134 around the series of impeller vanes 133 underneath. Accordingly, a portion of the compression flow path will be bounded by the ducted vanes and the surface of the annular body 131 between each impeller vanes 133. The shroud 134 and the series of impeller vanes 133 may be integrated as a single unit along with the annular body 131, extending inward to the impeller bore surface 132.

In this embodiment, the compressor rotor 130 may also include one or more seals between the compressor housing 110 and the powered impeller. The one or more seals are configured to impede the gas 15 from bypassing or flowing other than through the compressor flow path of the ducted vanes. For example, the powered compressor rotor 130 may include one or more dry seals, such as, for example, a labyrinth seal 300. The labyrinth seal 300 can be located at the low pressure end 128 of the compressor rotor 130. The labyrinth seal 300 can interact with labyrinth teeth 135 located on an outer circumference of the powered compressor rotor 130 proximate its upstream, or low pressure end. The labyrinth teeth 135 and labyrinth seal 300 can act as a sealing surface, formed by the interaction between the labyrinth teeth 135 and the labyrinth seal 300. The labyrinth teeth 135 can be annular ridges formed about the powered compressor rotor 130 operable to make contact with the labyrinth seal 300. In some embodiments, the labyrinth teeth 135 can be machined, formed into, or otherwise fixed to the shroud 134. Alternately, one or more similar labyrinth seals 300 may be machined, formed into, or otherwise fixed to the compressor housing 110. The labyrinth seal 300 can be machined or otherwise formed as a user-replaceable component that surrounds or encompasses the labyrinth teeth 135. In some examples, the labyrinth seal 300 can also be referred to as a shroud seal, depending on the location of the seal within the compressor 100. In some embodiments, the primary flowpath for the compressed gas 15 is through the compressor inlet 120 past the compressor rotor 130 and into the diffuser 160 and either to the discharge port 112 or a subsequent compressor stage. In some examples, the compressed gas 15 can flow back to the inlet of the compressor rotor 130 as secondary flowpath leakage. The labyrinth seal 300 is operable to reduce or prevent such secondary flowpath leakage.

In some other embodiments, an embodiment of the labyrinth seal 300 can be used in other locations within the compressor 100. For example, the dry gas seal 136, a shaft seal 137, or a rotor output seal 138 can all have various embodiments of the labyrinth seal 300.

Generally, the central axle 115 includes a member fixed to the compressor housing 110 at one or more locations. For example, the central axle 115 may include a member concentric with the center axis 95 and fixed to the compressor housing 110 at its aft and/or forward ends. Also for example, the central axle 115 may be solid, hollow, symmetrical, and/or asymmetrical. Accordingly, the central axle 115 may have a cylindrical shape, and be positioned in a location similar to that of a conventional drive shaft. However, unlike a conventional drive shaft, penetrating its respective compressor housing and operating at a high rotation speed, the central axle 115 may reside completely within the compressor housing 110, or at least be substantially sealed within the compressor housing 110.

Figure 3:
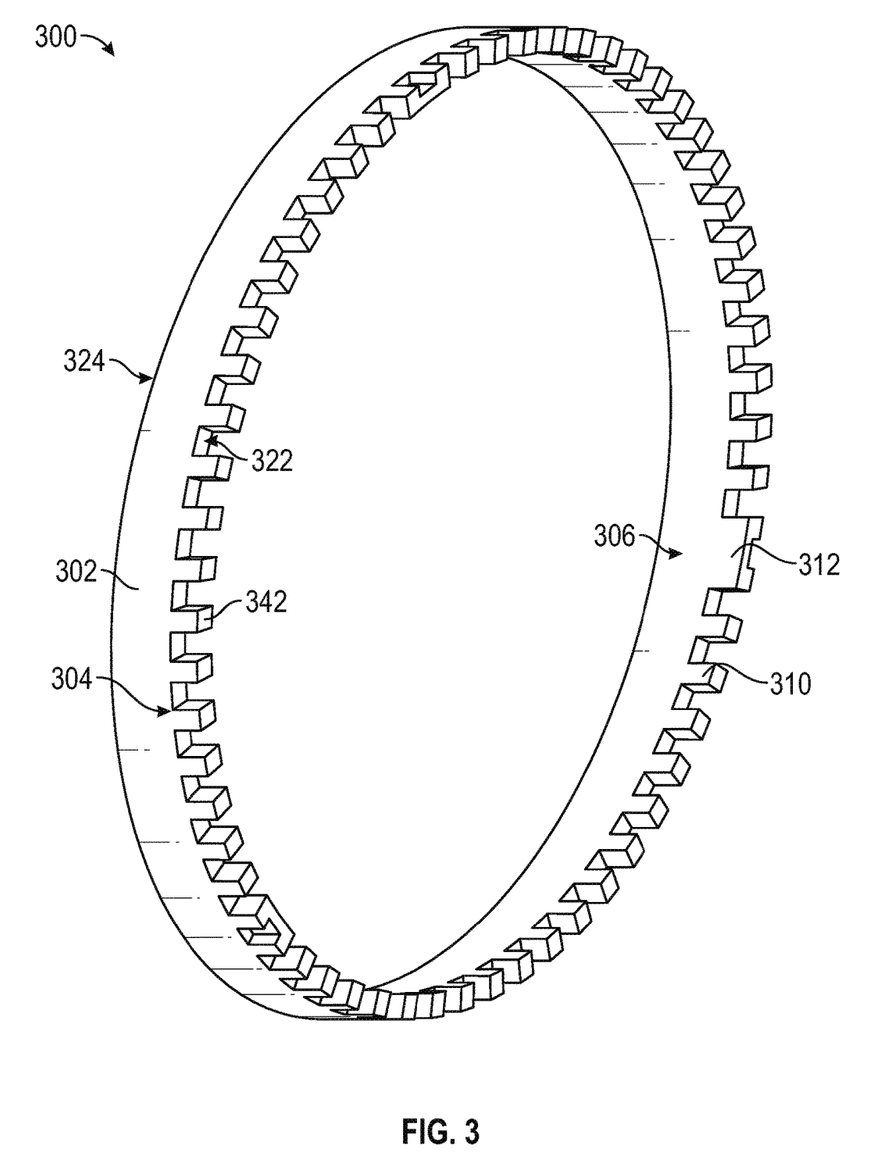
FIG. 3 is a perspective view of a labyrinth seal of the compressor of FIG. 1.

FIG. 3 is a perspective view of an embodiment of the labyrinth seal of FIG. 2. The labyrinth seal 300 can have a body 302 formed to fit in one or more locations within the compressor 100 as noted above. For example, the compressor rotor 130, shaft seal 137, rotor output seal 138 can have an embodiment of the labyrinth seal 300. The body 302 can be generally annular, cylindrical, or tubular in form. The labyrinth seal 300 can have a seal body 302 having an outer surface 304 and an inner surface 306. The labyrinth seal 300 can further have an aft surface 322 and a forward surface 324. The "aft" and "forward" refer generally to the orientation of the labyrinth seal 300 within the machine 100. The forward surface 324 can be proximate the low pressure end 128 of the compressor rotor 130 or the compressor stage inlet, while the aft surface 322 can be proximate the high pressure end 129 or the compressor stage exit.

The labyrinth seal 300 can further have a plurality of swirl teeth 310. For example, the labyrinth seal 300 pictured in FIG. 3 has 54 swirl teeth 310. Only one swirl tooth 310 is labeled for ease of description. The swirl teeth 310 can each have a swirl tooth end surface 342 defining the aft most portion of the swirl tooth 310. The labyrinth seal 300 can further have one or more enlarged teeth 312. The enlarged teeth 312 can aid in installation and removal of the labyrinth seal 300 from the compressor 100. While the swirl teeth 310 and the enlarged teeth 312 can have different dimensions, for ease of description, the following description referring to the swirl teeth 310 also applies to the enlarged teeth 312, unless noted otherwise. An individual swirl tooth 310 may act to decrease the swirl (or circumferential velocity) of the gas adjacent to or entering the labyrinth seal 300. As used herein, the collective teeth surfaces, including the swirl teeth 310, the aft surface 322, and the swirl tooth end surface 342 on the seal body 302, may be referred to as a "swirl brake".

In some embodiments, as the rotational speed or RPM of the compressor 100 increases, the compressor rotor 130 can induce a rotational speed on the compressed gas 15 on the high pressure end 129 of the compressor rotor 130, near the labyrinth seal 300. The rotational speed can manifest as circumferential velocity or "swirl" in the gas 15 (e.g., swirling gas 315 of FIG. 3). At the compressor rotor 130 spins, friction caused by parasite drag of the surface of the impeller vanes 133, for example, causes the gas 15 to move or flow in the direction of the rotation of the compressor rotor 130. The circumferential velocity (also referred to as "swirl") of the gas adjacent to the labyrinth seal 300 is a source of rotordynamic vibration instability during operation of the compressor 100. High swirl can cause the compressor rotor 130 (and e.g., the surrounding parts) to self-excite and vibrate within the compressor 100. The vibrations can increase with RPM. The vibrations can occur at the various components' natural or resonant frequencies and cause significant damage. The labyrinth seal 300 with the swirl teeth 310 serves as a swirl brake to reduce or minimize the circumferential velocity or swirl imparted on the gas 15. This helps to avoid or minimize rotordynamic instability as noted above.

Figure 4:
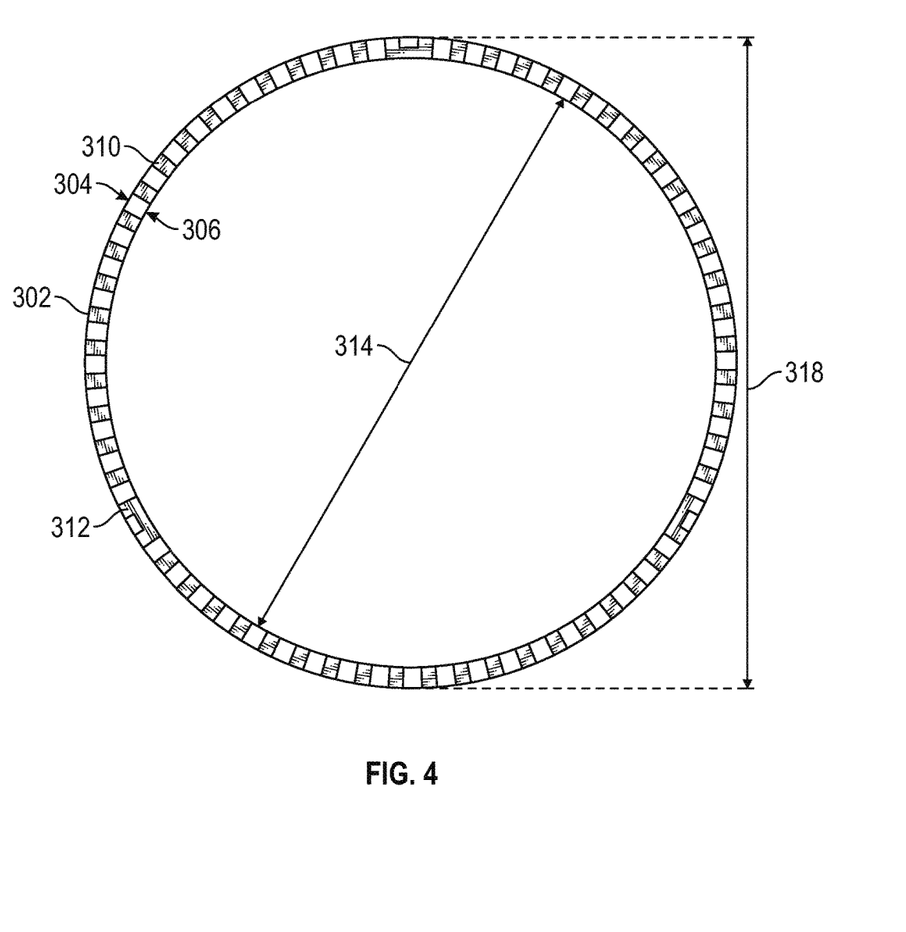
FIG. 4 is a plan view of the labyrinth seal of FIG. 3.

FIG. 4 is a plan view of the labyrinth seal 300 of FIG. 3. The labyrinth seal 300 can have an internal diameter 314 and an outer diameter 318 sized to create an interference fit when installed in the compressor 100. For example, the labyrinth seal 300 can be heated or cooled to expand or shrink (respectively) the labyrinth seal 300 for a press fit within the compressor 100. When the labyrinth seal 300 returns to ambient temperature it can expand or contract to an interference fit within the compressor 100.

The inner surface 306 can be formed from an abradable material that can interact with the labyrinth teeth 135 when installed. The labyrinth teeth 135 can abrade or erode portions of the inner surface 306 to form grooves. The interaction between the labyrinth teeth 135 rotating within the grooves formed on the inner surface 306 can form the tortuous path from the high pressure end 129 to the low pressure end 128, characteristic of the labyrinth seal 300.

In some embodiments, the body 302 has an annular shape when viewed in a plan view, as shown. Therefore each of the swirl tooth end surfaces 342 (see FIG. 3, FIG. 5) is an annular sector defined by curved profile of the inner surface 306 and the outer surface 304 of each swirl tooth 310. In some other embodiments, the swirl teeth 310 can have other shapes and profiles. For example, the swirl teeth 310 can have round or other polygonal shapes, incorporating triangular, square, rectangular, or other profiles that increase the presence and strength of free vortices (described below) between the swirl teeth 310.

Figure 5:
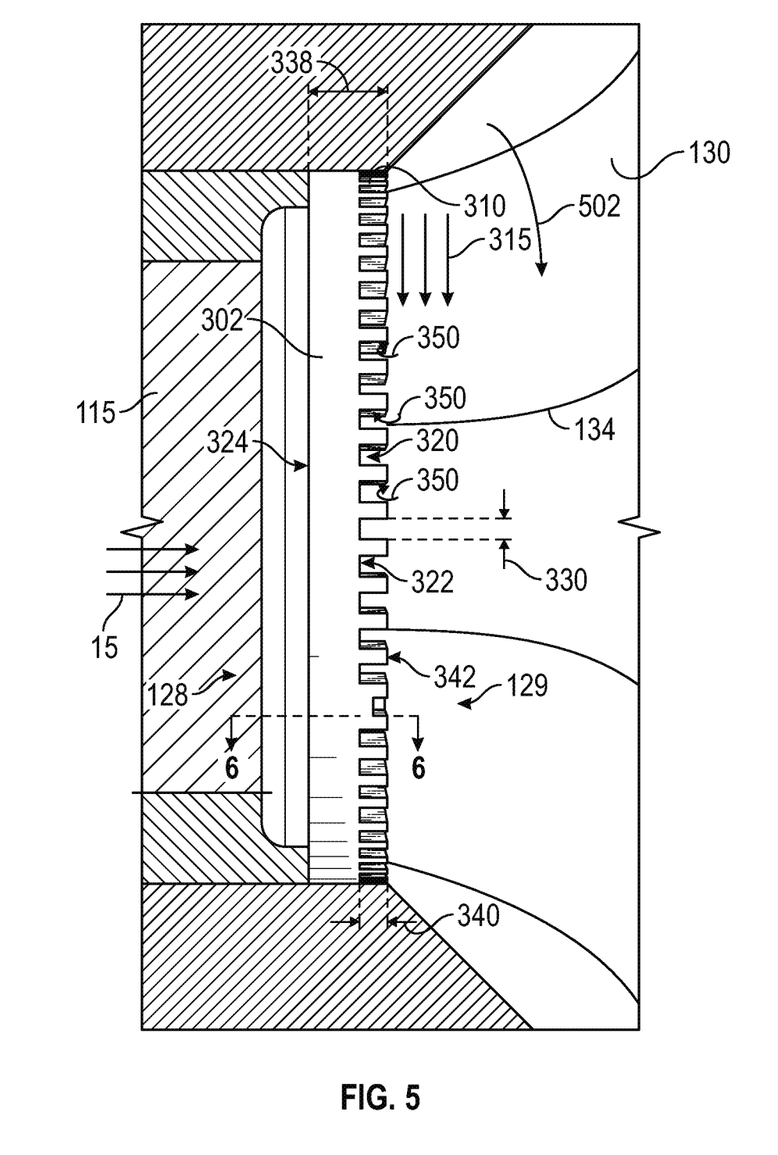
FIG. 5 is an elevation view of the labyrinth seal of FIG. 3.

FIG. 5 is cross sectional view of the compressor stage of FIG. 2. The teeth 310 can be spaced apart uniformly about the aft surface 322 of the body 302. Referring briefly back to FIG. 3, the enlarged teeth 312 can be separated evenly, providing, for example, a 120 degree separation between the centers of the three enlarged teeth 312. The other swirl teeth 310 can be evenly distributed between successive enlarged teeth 312. In some embodiments, the labyrinth seal 300 can have all uniformly sized and spaced swirl teeth 310.

The swirl teeth 310 and the enlarged teeth 312 can have a brake pitch (Pb) 330. The brake pitch 330 can form a swirl slot 320 and define a separation between adjacent swirl teeth 310. As there is more than one swirl slot 320 they may be collectively referred to herein as swirl slots 320. The swirl slots 320 can be a gap between the swirl teeth 310 that extends from the outer surface 304 to the inner surface 306 of the body 302 and the swirl teeth 310. The swirl slots 320 can have, for example, a rectangular shape (as shown), a square shape, or other shape, as required. Each of the swirl teeth 310 and the enlarged teeth 312 can further have a brake chord (Cb) 340. The brake chord 340 can define a separation between the swirl tooth end surface 342 and the aft surface 322, indicating a distance the teeth (e.g., the swirl teeth 310 and the enlarged teeth 312) extend away from the aft surface 322. Similarly the labyrinth seal 300 can have a seal width 338. The seal width 338 can define a total length (e.g., from forward to aft) of the body 302 and the swirl teeth 310, from the forward surface 324 to the swirl tooth end surface 342.

In some embodiments, the compressor rotor 130 can spin in, for example, a clockwise direction, as viewed from the forward portion of the compressor 100. This direction is shown by a rotation arrow 502. Accordingly, as depicted in FIG. 5, the as the gas 15 is compressed by the compressor rotor 130, the compressed gas 15 can begin to swirl with the rotation of the compressor rotor 130 in the vicinity of the high pressure end 129 of the labyrinth seal 300, and may be referred to herein as swirling gas 315. It should be appreciated that in some embodiments, the compressor rotor 130 can rotate in a direction opposite of that shown. As noted above, as RPM of the compressor 100 increases, the swirling gas 315 can cause self-excitation of the compressor rotor 130, if not minimized.

In some embodiments, the swirl teeth 310 and the swirl slots 320 can serve as a swirl brake to reduce the circumferential velocity of the swirling gas 315. As the circumferential velocity increases, low pressure areas within the swirl slots 320 form, causing the swirling gas 315 to impinge on the swirl teeth 310, creating a free vortex 350 (collectively free vortices 350) within the swirl slots 320. Only three free vortices 350 is depicted in FIG. 5 for ease of description. The free vortices 350 can reduce the circumferential velocity of the swirling gas 315 and can increase the operating RPM of the compressor by minimizing swirl and reducing self-excitation. In such an embodiment, the swirl teeth 310 can thus form a swirl brake on the labyrinth seal 300.

In some embodiments, the number and spacing of the swirl teeth 310 on the labyrinth seal 300 can be significant. For example, the lesser the brake pitch 330 is, narrower the swirl slots 320 and the closer the swirl teeth 310 are arranged. When the swirl teeth 310 are close together, the swirl slots 320 become smaller/narrower and reduce the size and effectiveness of the free vortices 350, and therefore provide less swirl reduction of the swirling gas 315. Conversely, if the brake pitch 330 is too large, and the swirl teeth 310 are too far apart, the swirl slots 320 can become too large to form the free vortices 350. Thus a large brake pitch 330 can also have a smaller effect on swirl reduction.

In such cases, the brake pitch 330 to brake chord 340 ratio (pitch/chord or $P_b/C_b$) then becomes an important metric to provide proper spacing (e.g., brake pitch 330) between the swirl teeth 310. In some embodiments, the $P_b/C_b$ ratio can be in a range from 1.0 to 1.4. In some embodiments the $P_b/C_b$ equals 1.27. This can be an optimum ratio to minimize swirl. However, in some examples, other ratios as high as 2.0, 3.0, or higher may also be possible given operating conditions.

Figure 6:
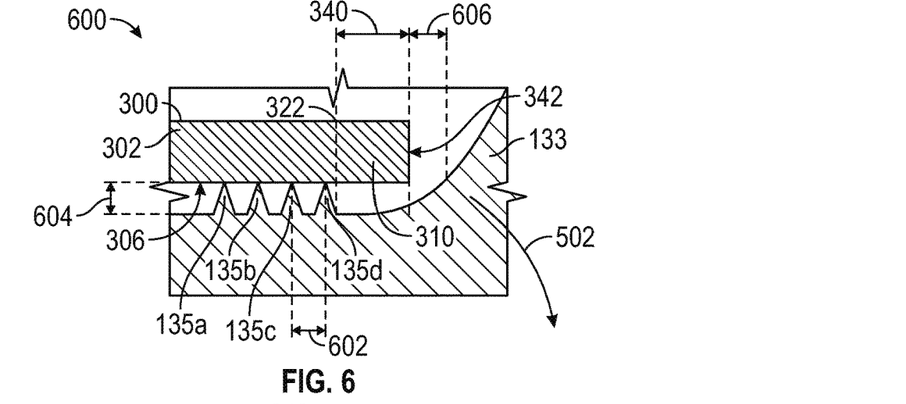
FIG. 6 is a detailed side view of a portion of an embodiment of the labyrinth seal of FIG. 3.

FIG. 6 is a detailed view of a portion of an embodiment of a labyrinth seal assembly taken along the line 6-6 of FIG. 5. A labyrinth seal assembly 600 can have the labyrinth seal 300 and the labyrinth teeth 135 of the compressor rotor 130. Four labyrinth teeth 135a, 135b, 135c, and 135d are shown and referred to collectively as the labyrinth teeth 135. It should be noted that the four labyrinth teeth 135 shown is exemplary and more or fewer labyrinth teeth 135 are possible. The labyrinth teeth 135 can be adjacent to or in contact with the inner surface 306 of the body 302. The labyrinth teeth 135 can have a tooth spacing 602 and a tooth height 604. The tooth spacing 602 can affect the effectiveness of the labyrinth seal 300. The tooth height 604 can determine how much of the inner surface 306 that the labyrinth teeth 135 abrade to for the seal.

As noted above and shown in FIG. 6, the brake chord 340 extends from the aft surface 322 of the body 302 to the swirl tooth end surface 342. In the labyrinth seal assembly 600, the swirl tooth end surface can overhang the aft most labyrinth tooth 135d, as shown. In some embodiments, brake chord 340 can extend further downstream of the labyrinth teeth 135 toward the impeller vanes 133 or the compressor rotor 130, for example. This configuration can provide certain aerodynamic and rotordynamic performance improvements, given different impeller shapes and compression ratios.

The labyrinth seal assembly 600 can also have an impeller gap 606. The impeller gap 606 can describe the distance between the swirl tooth end surface 342 and, for example, the impeller vane 133 or the compressor rotor 130. The impeller gap 606 can be designed to avoid or prevent possibility of rub between the rotating impeller and the swirl brake (e.g., the swirl teeth 310) or labyrinth seal 300. In general for a fixed-size compressor rotor 130 (or impeller vane 133) a change in the disposition of the swirl teeth 310 with respect to the aft most labyrinth tooth 135d can affect the impeller gap 606. This is described further in connection with FIG. 7 and FIG. 8.

Figure 7:
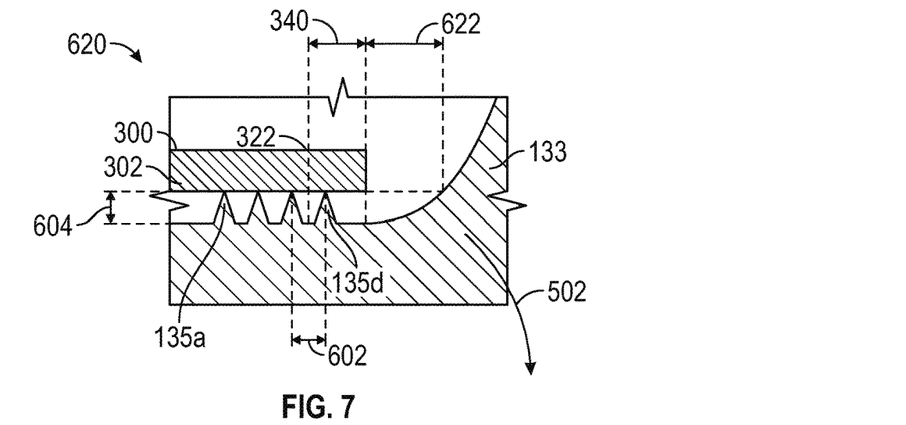
FIG. 7 is a detailed side view of a portion of another embodiment of the labyrinth seal of FIG. 3.

FIG. 7 is a detailed view of a portion of another embodiment of the labyrinth seal assembly taken along the line 6-6 of FIG. 5. A labyrinth seal assembly 620 can have the labyrinth seal 300 and the labyrinth teeth 135, similar to the labyrinth seal assembly 600.

Similar to above, the labyrinth seal assembly 620 can also overhang the most downstream, or the aft most labyrinth tooth 135d. However, the labyrinth tooth 135d can score or abrade the inner surface 306 at a location along the brake chord 340 of the swirl teeth 310, or downstream (e.g., aft) of the aft surface 322 of the body 302. Extending the sealing surfaces to the inner surface 306 of the swirl teeth 310 can provide additional strength to the free vortices 350 and can increase sealing characteristics of the labyrinth seal in certain arrangements.

The labyrinth seal assembly 620 can have an impeller gap 622. The impeller gap 622 can describe the distance between the swirl tooth end surface 342 and, for example, the impeller vane 133 or the compressor rotor 130. As noted above, closer the aft most labyrinth tooth 135d approaches the swirl tooth end surface 342, the larger the impeller gap 606, 622 becomes. Accordingly the impeller gap 622 is larger than the impeller gap 606.

Figure 8:
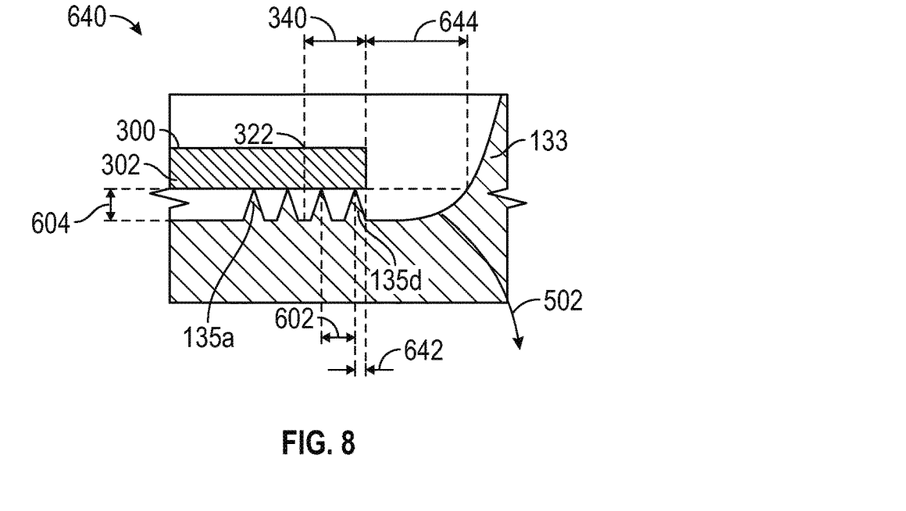
FIG. 8 is a detailed side view of a portion of another embodiment of the labyrinth seal of FIG. 3.

FIG. 8 is a detailed view of a portion of another embodiment of the labyrinth seal assembly taken along the line 6-6 of FIG. 5. A labyrinth seal assembly 640 can have the labyrinth seal 300 and the labyrinth teeth 135, similar to the labyrinth seal assembly 600. Different from the labyrinth seal assembly 600 and the labyrinth seal assembly 620, the labyrinth seal assembly 640 can have the swirl tooth end surface 342 proximate or adjacent to the aft most labyrinth tooth 135d. The separation from the tip of the labyrinth tooth 135d to the swirl tooth end surface 342 can be a tooth gap 642. In some embodiments, it may be advantageous to minimize the tooth gap 642 and bring the aft most tooth 135d in close alignment with the swirl tooth end surface 342. This can bring an impeller gap 644 to a distance larger than that of the impeller gaps 606, 622

INDUSTRIAL APPLICABILITY

Compressors such as those described herein rely on various seals (e.g., labyrinth seals or other dry seals) to maintain pressurization as the working fluid is compressed. One such seal is the labyrinth seal 300 (FIG. 2). The compressor rotor 130 (or other rotating body) can have labyrinth teeth 135 that are a series of circumferential ridges that resemble teeth when viewed from a lateral perspective (see FIG. 6, FIG. 7, FIG. 8). The labyrinth teeth 135 interact with the abradable material on the inner surface 306 of the labyrinth seal 300. The teeth can score indentations in the inner surface 306 of the labyrinth seal 300 creating channels or grooves that complement the size and shape of the labyrinth teeth. This complementary or interlocking relationship of the labyrinth teeth 135 and the grooves in the inner surface 306 can produce the long, circuitous path which slows leakage from a high pressure end 129 of the seal to the low pressure end 128.

As the compressor rotor 130 spins, the gas 15 is drawn in by the impeller vanes 133 and is compressed at it leaves the compressor rotor 130 on the high pressure side 129. The rotation of the compressor rotor 130 imparts a rotation on the compressed gas and induces a swirling effect on the gas 15 turning it into swirling gas 315, as shown in FIG. 5. The circumferential velocity of the swirling gas at the entrance (e.g., the low pressure side 128) of the labyrinth seal 300, as well as the same through the labyrinth seal 300 on the high pressure side 129, increases with compressor rotor 130 RPM and can lead to self-excitation of the compressor 100. The self-excitation causes vibrations, or rotordynamic instability, that can damage components.

In order to reduce the severity of the vibrations, circumferential velocity at the seal entry and through the seal should be minimized where possible. The addition of the swirl teeth 310 and the swirl slots 320 to the high pressure side of the labyrinth seal 300 can serve as a swirl brake to minimize circumferential velocity of the swirling gas 315.

The swirl teeth 310 can have a brake chord 340 describing a "height" of each tooth, or a separation of the swirl tooth end surface 342 and the aft surface 322 of the seal body 302. The swirl teeth 310 can further have a brake pitch 330 that describes the separation of each adjacent swirl tooth 310 or the width of the "notches" between the swirl teeth 310. The ratio of the brake pitch 330 to the brake chord 340 ("$P_b/C_b$ ratio") can be optimized in order to maximize the swirl reduction of the labyrinth seal 300. If the $P_b/C_b$ ratio is too large, the swirl teeth 310 are too far apart to effectively create the free vortices 350. The same can be true if the $P_b/C_b$ ratio is too small: the swirl teeth 310 are too close together to allow the free vortices to form. However, it has been shown that a $P_b/C_b$ ratio in the range from 1.0 to 1.4 provides an optimum swirl reduction in compressor 100. These ratios can be derived through analysis using computation fluid dynamics to show the optimum ratios for a given design. In some cases, larger ratios from 2.0, 3.0 and higher can also be advantageous under certain configurations.

The methods and devices as disclosed herein can improve performance of new compressors and compressors that have been retrofitted with the labyrinth seal 300. The swirl braking provided by the labyrinth seal 300 can increase operating speed (e.g., RPM) by reducing the incidence of self-excitation in the compressor 100, thereby increasing output pressure. The capability of the swirl brakes to avoid rotordynamic instability at speeds and operating pressures higher than those without swirl brakes, enable reliable operation of the compressors by end-users.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The preceding detailed description is merely exemplary in nature and is not intended to limit the invention or the application and uses of the invention. The described embodiments are not limited to use in conjunction with a particular type of gas turbine engine. It will be appreciated that the gas turbine engine in accordance with this disclosure can be implemented in various other configurations. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A labyrinth seal for reducing circumferential velocity in a compressor having one or more centrifugal compressor stages, the labyrinth seal comprising:
    a seal body having an annular shape, a forward surface corresponding to a low pressure end of the labyrinth seal, and an aft surface corresponding to a high pressure end of the labyrinth seal, the seal body having an interior surface formed from an abradable material operable to contact a plurality of labyrinth teeth of the one or more centrifugal compressor stages;
    and a plurality of swirl teeth extending from the aft surface of the seal body, each swirl tooth of the plurality of swirl teeth having a swirl tooth end surface distal to the aft surface and a brake chord, the brake chord defining a separation between the aft surface and the swirl tooth end surface;
    a plurality of swirl slots formed between adjacent swirl teeth of the plurality of swirl teeth, each swirl slot of the plurality of swirl slots having a brake pitch defining a distance between the adjacent swirl teeth; and
    the plurality of labyrinth teeth located proximate the interior surface and operable to score the interior surface as the compressor rotates, an aft most labyrinth tooth of the plurality of labyrinth teeth being disposed adjacent to the plurality of swirl teeth between the aft surface end and the swirl tooth end surface, and a forward most labyrinth tooth of the plurality of labyrinth teeth being proximate the low pressure end.

2. The labyrinth seal of claim 1 wherein a ratio of the brake pitch to the brake chord is in a range from 1.0 to 1.4.

3. The labyrinth seal of claim 1, wherein the plurality of swirl teeth are spaced equally about the aft surface of the labyrinth seal.

4. The labyrinth seal of claim 1, wherein the plurality of swirl teeth extend in a direction parallel to a central axis of the compressor.

5. The labyrinth seal of claim 1, wherein the seal body further comprises an outer surface and an inner surface radially inward from the outer surface, and wherein the swirl slots extend from the inner surface to the outer surface of the seal body.

6. A labyrinth seal assembly for reducing swirl in one or more compressor stages of a multi stage gas compressor, the labyrinth seal assembly comprising:
    a labyrinth seal having
        a tubular body having a low pressure end opposite a high pressure end and an interior surface formed of an abradable material, and
        a plurality of swirl teeth extending from the high pressure end of the tubular body, each swirl tooth of the plurality of swirl teeth having a swirl tooth end surface, a brake chord defining a separation between the high pressure end and the swirl tooth end surface, and a brake pitch defining a separation between adjacent swirl teeth of the plurality of swirl teeth, such that the plurality of swirl teeth are evenly distributed about the high pressure end; and
    a plurality of labyrinth teeth proximate the interior surface and operable to score the abradable surface as the compressor rotates, an aft most labyrinth tooth of the plurality of labyrinth teeth being proximate the high pressure end and disposed adjacent to the plurality of swirl teeth proximate the swirl tooth end surface, and a forward most labyrinth tooth of the plurality of labyrinth teeth being proximate the low pressure end.

7. The labyrinth seal assembly of claim 6, wherein the aft most labyrinth tooth is disposed forward of the high pressure end.

8. The labyrinth seal assembly of claim 6, wherein the tubular body further comprises an exterior surface radially outward from the interior surface, and a plurality of swirl slots formed between adjacent swirl teeth of the plurality of swirl teeth, wherein the swirl slots extend radially through the tubular body from the interior surface to the exterior surface.

9. The labyrinth seal assembly of claim 6, wherein the plurality of swirl teeth extend in a direction parallel to a central axis of the multi stage gas compressor.

10. A device for reducing circumferential velocity in a compressor having one or more centrifugal compressor stages, the device comprising:
   an annular body having a low pressure end, a high pressure end, and an abradable inner surface operable to form a labyrinth seal when proximate a plurality of labyrinth teeth; and
   a swirl brake disposed on the high pressure end of the annular body, the swirl brake having
      a plurality of swirl teeth, each swirl tooth of the plurality of swirl teeth having swirl tooth end surface, and a brake chord defining a separation of the swirl tooth end surface and the high pressure end of the annular body, and
      a plurality of swirl slots, each swirl slot having a brake pitch defining a space between adjacent swirl teeth; and
   the plurality of labyrinth teeth located proximate the abradable inner surface and operable to score the interior surface as the compressor rotates, an aft most labyrinth tooth of the plurality of labyrinth teeth being proximate the high pressure end, adjacent to the plurality of swirl teeth between the high pressure end and the swirl tooth end surface, and a forward most labyrinth tooth of the plurality of labyrinth teeth being proximate the low pressure end.

11. The device of claim 10, wherein the plurality of swirl teeth extend away from the high pressure side of the annular body.

12. The device of claim 10, wherein the swirl slots extend from the abradable inner surface of the annular body through the annular body to the outer surface of the annular body.

13. The device of claim 10 wherein a ratio of the brake pitch to the brake chord is in a range from 1.0 to 2.0.

14. The device of claim 10, wherein the plurality of swirl teeth are spaced equally about the high pressure end of the annular body.

15. The device of claim 10, wherein the annular body is operable to surround at least a portion of a compressor stage of a multi-stage compressor.

* * * * *